Patented June 8, 1926.

1,587,708

UNITED STATES PATENT OFFICE.

WALTER DUISBERG AND WINFRIED HENTRICH, OF LEVERKUSEN, CLAUS WEINAND, OF COLOGNE-ON-THE-MULHEIM, AND LUDWIG ZEH, OF LEVERKUSEN, GERMANY, ASSIGNORS TO GRASSELLI DYESTUFF CORPORATION, OF NEW YORK, N. Y., A CORPORATION OF DELAWARE.

PROCESS OF DYEING CELLULOSE ESTERS AND CELLULOSE ETHERS.

No Drawing. Application filed June 8, 1925, Serial No. 35,770, and in Germany June 26, 1924.

We have invented new and useful improvements in dyeing of cellulose compounds.

We have found that ortho-aminoanthraquinone sulfonic acids have very strong affinity for cellulose esters and cellulose ethers such as cellulose formate, cellulose acetate, ethyl cellulose, propyl cellulose, etc., which products will be referred to herein as organo-oxy-cellulose compounds.

In applying the aminoanthraquinone sulfonic acids to such cellulose materials the most common practice is to dissolve the dyestuff or alternatively its alkali metal salt in water with the eventual addition of the usual dye adjuvants such as Glaubers salt, acetic acid if desired, and then to enter the dye bath with the cellulose material at a temperature of not exceeding 70° C. and to leave in the dyebath until the desired shade is obtained. The goods are then rinsed, squeezed and dried. When dyeing cellulose acetate silk for instance amounts of ½–3 parts of dyestuff to 100 parts of fibre in ½ to 1 per thousand solution yields shades of great brilliancy and depth. In dyeing other organo-oxy-cellulose material the process of applying ortho-aminoanthraquinone sulfonic acids to same can be modified so as to adapt itself to the particular material without departing from the spirit of our invention.

The aminoanthraquinone sulfonic acids featured by our invention are the compounds in which the amino and sulfonic acid groups are in ortho position to each other, as for instance in 1—2, 2—1, 2—3 position and the 4-position contains hydrogen or a substituent other than an amino group or a hydroxyl group such as halogen or a carbon radicle or sulfur attached to a carbon radicle. The compounds are represented by the general formula

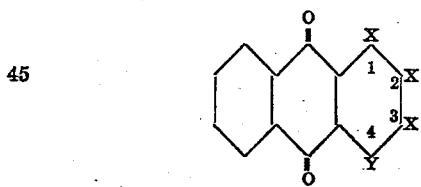

in which one X stands for an amino group and an X in ortho position thereto stands for a sulfo group, the third X stands for hydrogen and Y stands for hydrogen, halogen, a carbon radicle or a S-carbon radicle. These simple ortho aminoanthraquinone sulfonic acids impart to the organo-oxy-cellulose compounds yellow to orange shades. Further substitution in the anthraquinone nucleus modifies the shade and through the use of the various substituted ortho-aminoanthraquinone sulfonic acids shades rangings practically over the whole color scale can be obtained.

The ease of application, the excellent fastness properties and the wide range of shades obtained by our novel process makes it excedingly valuable for the practical application of organo-oxy cellulose compound materials.

The table below shows a few of the shades that can be obtained by the use of our ortho-aminoanthraquinone sulfonic acids:—

| Dyestuff | Shade on cellulose acetate silk |
|---|---|
| 1-aminoanthraquinone-2-sulfonic acid | Orange. |
| 2-aminoanthraquinone-1-sulfonic acid | Yellow. |
| 2-aminoanthraquinone-3-sulfonic acid | Yellow. |
| 1-amino-4-bromoanthraquinone-2-sulfonic acid | Yellowish-red. |
| 1-amino-5-toluidoanthraquinone-2-sulfonic acid | Dark-red. |
| 1-amino-4-thiotolylanthraquinone-2-sulfonic acid | Red-violet. |
| 1-amino-4-dihydroglyoxalylanthraquinone-2-sulfonic acid | Violet. |

We claim:—

1. Process of dyeing organo-oxy-cellulose materials which consists in applying thereto ortho-aminoanthraquinone sulfonic acid compounds of the general formula

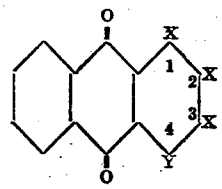

in which one X stands for an amino group and an X in ortho position thereto stands for a sulfo group, the third X stands for hydrogen and Y stands for hydrogen, halogen, a carbon radicle or a S-carbon radicle.

2. Process of dyeing organo-oxy-cellulose materials which consists in treating the same with water solutions of ortho-aminoanthraquinone sulfonic acid compounds of the general formula

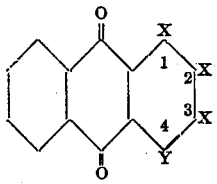

in which one X stands for an amino group and an X in ortho position thereto stands for a sulfo group, the third X stands for hydrogen and Y stands for hydrogen, halogen, a carbon radicle or a S-carbon radicle.

3. As new products organo-oxy-cellulose materials dyed with ortho-aminoanthraquinone sulfonic acid compounds of the general formula

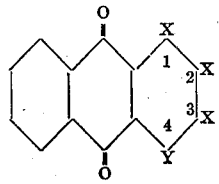

in which one X stands for an amino group and an X in ortho position thereto stands for a sulfo group, the third X stands for hydrogen and Y stands for hydrogen, halogen, a carbon radicle or a S-carbon radicle.

4. As new products cellulose acetate silks dyed with ortho-aminoanthraquinone sulfonic acid compounds of the general formula

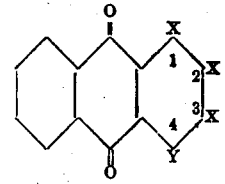

in which one X stands for an amino group and an X in ortho position thereto stands for a sulpho group, the third X stands for hydrogen and Y stands for hydrogen, halogen, a carbon radicle or a S-carbon radicle.

In testimony whereof we have hereunto set our hands.

WALTER DUISBERG.
WINFRIED HENTRICH.
CLAUS WEINAND.
LUDWIG ZEH.